(12) United States Patent
Weibel et al.

(10) Patent No.: US 11,536,665 B2
(45) Date of Patent: Dec. 27, 2022

(54) ABSORBANCE-BASED COLORIMETRIC DEVICE SYSTEM

(71) Applicant: Purdue Research Foundation, West Lafayette, IN (US)

(72) Inventors: Justin A Weibel, West Lafayette, IN (US); Suresh V Garimella, West Lafayette, IN (US); Aditya Chandramohan, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 55 days.

(21) Appl. No.: 16/989,954

(22) Filed: Aug. 11, 2020

(65) Prior Publication Data
US 2021/0048394 A1 Feb. 18, 2021

Related U.S. Application Data

(60) Provisional application No. 62/887,327, filed on Aug. 15, 2019.

(51) Int. Cl.
*G01N 21/25* (2006.01)
*G01N 21/78* (2006.01)

(52) U.S. Cl.
CPC .......... *G01N 21/78* (2013.01); *G01N 21/251* (2013.01)

(58) Field of Classification Search
CPC . G01N 21/78; G01N 2021/035; G01N 21/251
See application file for complete search history.

(56) References Cited

U.S. PATENT DOCUMENTS

2014/0231259 A1* 8/2014 Srinivasan .......... B01F 33/3021
   204/601
2016/0274105 A1* 9/2016 Whitesides ...... G01N 33/54386

OTHER PUBLICATIONS

Garcia-Cordero J., et al., Sessile droplets for chemical and biological assays. Lab Chip,2017, 17, 2150-2166.
Regnault C., et al., Microfluidic Devices for Drug Assays. High-Throughput 2018, 7, 18; doi:10.3390/ht7020018.

* cited by examiner

*Primary Examiner* — Jennifer Wecker
*Assistant Examiner* — Alea N. Martin
(74) *Attorney, Agent, or Firm* — Purdue Research Foundation

(57) ABSTRACT

The present disclosure relates to a novel absorbance-based colorimetric device system, and to methods of using the novel absorbance-based colorimetric device system.

3 Claims, 7 Drawing Sheets

ABSORBANCE-BASED COLORIMETRIC DEVICE SYSTEM

CROSS-REFERENCE TO RELATED APPLICATION

This application claims priority to U.S. Provisional Patent Application No. 62/887,327, which was filed Aug. 15, 2019, and the content of which is hereby incorporated by reference in its entirety.

TECHNICAL FIELD

The present disclosure relates to a novel absorbance-based colorimetric device system, and to methods of using the novel absorbance-based colorimetric device system.

BACKGROUND

This section introduces aspects that may help facilitate a better understanding of the disclosure. Accordingly, these statements are to be read in this light and are not to be understood as admissions about what is or is not prior art.

Colorimetry is a widely used approach for measurement of the concentration of biological samples in a liquid. Colorimetry techniques have been developed to detect concentrations of glucose, protein, fatty acids, nucleic acids, etc. In colorimetry, the sample is mixed with a reagent that causes a color change in the sample-reagent mixture that is a function of the concentration of the sample. Conventional colorimetric analysis involves measuring the mixture absorbance at a specific wavelength using either a colorimeter, spectrophotometer, or microtiter plate reader. Miniaturization of this process has the benefits of reducing the quantity of the reagent as well as the sample needed, thus allowing for less invasive testing in clinical applications. The measurement time can also be significantly reduced due to the faster mixing process in miniaturized systems.

The Bradford assay is one of the most commonly used protein quantitation techniques. The technique involves mixing a protein-containing sample with the reagent dye Coomassie™ Brilliant Blue G-250. This reagent dye is known to exist in three ionic states: anionic, cationic, and neutral. The neutral and anionic states both react to the amino acids in the protein, the former by hydrophobic and electrostatic interactions and the latter by electrostatic interactions. These reactions form protein-dye complexes that shift the absorbance spectrum of the mixture. The measured absorbance change is correlated with a set of standard concentrations to determine the protein concentration in the sample. The non-instantaneous nature of this protein-dye reaction means that there is likely a combined effect of the reaction and the mixing on the signal during the measurement timescale. In conventional Bradford assays that are conducted in macroscale cuvettes, the measurement requires on the order of 5 min for the reaction to be completed, due to the longer time for mixing in macroscale devices. Macroscale mixing can also lead to protein denaturation, and foaming with excessive vortexing. A quicker method of mixing that avoids denaturation, as is possible at the smaller length scales of micromixing techniques, can allow the reaction to be completed more rapidly.

Recent efforts have attempted high-throughput screening of sample concentration using absorbance-based colorimetry by fabricating miniaturized wells with higher density of wells per unit area than previously achieved; however, these techniques require complex machining to create precise wells at such high density. Furthermore, a key issue that must be addressed in these low-volume microwells is the thorough mixing of the samples. Several active micromixing approaches have been proposed in the literature, including ultrasonication, external vibration of T-junction microchannels, magnetohydrodynamic stirrers, and electro-osmotic flow in microchannels. Most of these approaches demand complex control schemes and additional manufacturing requirements. Multilaminar mixing is another approach that uses intricate patterns of channels to induce chaotic flows. This technique often requires longer flow lengths and still requires complex fabrication to create the complex flow patterns necessary for mixing.

Therefore, novel miniature micromixing devices to conduct rapid sample-dye reactions therefore to provide benefit for high-throughput microplate-based colorimetric analysis are still needed.

SUMMARY

The present disclosure relates to a novel absorbance-based colorimetric device system, and to methods of using the novel absorbance-based colorimetric device system.

In one embodiment, the present disclosure provides an absorbance-based colorimetric device system, comprising:
  a light source;
  a sample plate, wherein the sample plate comprises a first coated surface configured to load a sample droplet to be tested, and a second surface on the opposite side to the first coated surface, wherein the first coated surface is configured to allow a sample droplet loaded onto the first coated surface to be substantially non-wetting, and wherein the sample plate has sufficient transparency and therefore is capable to pass some or all light received from the light source after the light is passed through the sample droplet;
  a light-to-electrical signal-converting device, wherein the light-to-electrical signal-converting device is placed adjacent to the second surface of the sample place; and
  an optional aperture that confines the area of light to be passed through the sample droplet loaded onto the sample plate, wherein the optional aperture is placed between the light source and the first coated surface of the sample plate;
  wherein the sample plate is configured to be placed between the light source and the light-to-electrical signal-converting device.

DETAILED DESCRIPTION

Figure 1:
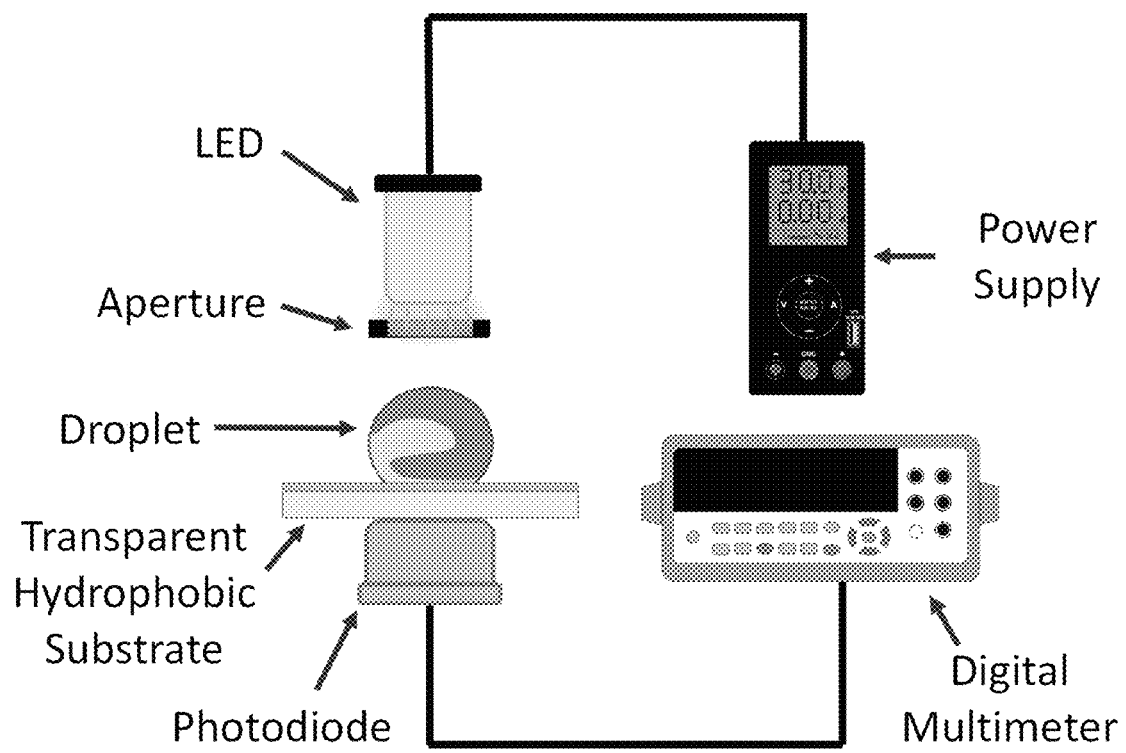
FIG. 1 illustrates a schematic diagram of the experimental setup used for the sessile-droplet-based absorbance measurement.

For the purposes of promoting an understanding of the principles of the present disclosure, reference will now be made to embodiments illustrated in drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

It should be noted that several characteristics of droplets placed on nonwetting surfaces make such surfaces an attractive platform for miniaturized colorimetry. Droplets on nonwetting surfaces demonstrate significantly lower evaporation rates than droplets on wetting substrates because of the suppression of evaporation at the contact line of the droplet due to vapor confinement combined with evaporative cooling. This suppression is an important feature for colorimetric applications, where the reaction needs to be completed and the absorbance measurement taken before too much evaporation has occurred. Furthermore, aqueous droplets demonstrate buoyancy-driven convection on nonwetting substrates, which offers an order of magnitude higher internal flow velocities compared to wetting surfaces. This leads to buoyancy-induced mixing rates that are two orders of magnitude higher than simple diffusion-based mixing, without requiring long flow lengths as in other passive micromixers. This aspect of the droplet-based system reduces the time to complete the reaction between the dye and the reagent. Finally, sessile droplets of known volumes and contact angles can be simply placed on a hydrophobic substrate with a small footprint, without the need for complex fabrication of microplates.

Based on the concepts described above, the present disclosure provides a system/method that may use a droplet microarray as an alternative to microtiter plates for absorbance-based colorimetry. The concept involves making real-time absorbance measurements through droplets on a nonwetting substrate, where the droplets are formed by placing a droplet of reagent dye upon a droplet of sample solution, and comparing the absorbance signal response to that of known concentration standards. The nonwetting substrate induces buoyancy-driven convection and ensures rapid mixing and complete reaction of the reagent into the sample, while also ensuring that evaporation of the droplet is suppressed. The absorbance is measured by illuminating the droplet at the wavelength of interest from one side and by measuring the outgoing light on the other. The current study demonstrates this sessile-droplet-based absorbance measurement for colorimetric analysis of protein concentration. A proof-of-concept implementation approach is described and real-time absorbance measurement signals are analyzed for pre-mixed droplets and in situ droplet mixing.

In one embodiment, the present disclosure provides an absorbance-based colorimetric device system, wherein the system comprises a light source, a sample plate comprising a first side and a second opposite side to the first side, a light-to-electrical signal-converting device, wherein the sample plate is configured to be placed between the light source and the light-to-electrical signal-converting device. In one aspect, at least one side of the sample plate is coated. In one aspect, the coated side is coated with a hydrophobic material to serve as the sample loading side to allow a sample droplet loaded onto the first coated surface to be substantially non-wetting.

In one embodiment, the present disclosure provides an absorbance-based colorimetric device system, wherein the system comprises, a light source;

a sample plate, wherein the sample plate comprises a first coated surface configured to load a sample droplet to be tested, and a second surface on the opposite side to the first coated surface, wherein the first coated surface is configured to allow a sample droplet loaded onto the first coated surface to be substantially non-wetting, and wherein the sample plate has sufficient transparency and therefore is capable to pass some or all light received from the light source after the light is passed through the sample droplet;

a light-to-electrical signal-converting device, wherein the light-to-electrical signal-converting device is placed adjacent to the second surface of the sample place; and an optional aperture that confines the area of light to be passed through the sample droplet loaded onto the sample plate, wherein the optional aperture is placed between the light source and the first coated surface of the sample plate;

wherein the sample plate is configured to be placed between the light source and the light-to-electrical signal-converting device.

In one embodiment regarding the absorbance-based colorimetric device system of the present disclosure, the light source may be any kind of light source as far as it can provide light of wavelength or wavelength range where a colorimetric reagent shows the greatest trend in absorbance with concentration. The wavelength or wavelength range is generally dependent on the reaction.

In one embodiment regarding the absorbance-based colorimetric device system of the present disclosure, the sampler plate may be any kind of organic or inorganic material as far as it provides sufficient transparency to the light. The sample plate may be but is not limited to partial or complete transparent polymer or glass plate. In one aspect, the sample plate has at least 20%, 30%, 40%, 50%, 60, 70%, 80, 90%, 95% transparency to the light.

In one embodiment regarding the absorbance-based colorimetric device system of the present disclosure, the coated surface if achieved by applying a coating material that allow a sample droplet loaded onto the first coated surface to be substantially non-wetting. Any coating material that can serve this purpose is suitable. The material may be organic material or inorganic material. The preferred coating in the present disclosure is hydrophobic coating material.

Although Teflon material is used to coat the sample plate in the present disclosure, other suitable hydrophobic coating material may be used as well. In one aspect, the term "nonwetting" may require a contact angle between a sample droplet and the sample plate to be at least 110 degree or greater.

In one embodiment regarding the absorbance-based colorimetric device system of the present disclosure, the light-to-electrical signal-converting device may be any suitable device such as but is not limited to a photodiode. The rational of using a light-to-electrical signal-converting device in the present disclosure is to correlate the light absorbance to the concentration of a sample droplet loaded onto the sample plate. Therefore, any device that can serve this purpose may be suitable. Such a device may be a single device such as a photodiode or a series of devices serving for the purpose.

In one embodiment regarding the absorbance-based colorimetric device system of the present disclosure, the aperture is optional especially if the light source has a built in element for the same purpose. An optical system typically has many openings or structures that limit the light ray or light ray bundles. These structures may be the edge of a lens or mirror, or a ring or other fixture that holds an optical element in place, or may be a special element such as a diaphragm placed in the optical path to limit the light admitted by the system. An aperture may be any kind of device as far as it can confine the area of the illumination to within the radius of a sample droplet loaded onto the sample plate.

In one embodiment regarding the absorbance-based colorimetric device system of the present disclosure, wherein the system comprises a plurality of light sources, a plurality of light-to-electrical signal-converting devices, wherein the plurality of light sources and/or light-to-electrical signal-converting devices are configured to test a plurality of sample droplets. The plurality of sample droplets can be in a single or a plurality of sample plates. Arranging the light-to-electrical signal-converting device on the opposite side of the light source and the sample droplet makes the testing more efficient and less interference from each sample droplet.

In one embodiment regarding the absorbance-based colorimetric device system of the present disclosure, the system is configured to measure sample concentration through very small sample droplet, which may have a volume of about 0.1-100 μL, 0.1-75 μL, 0.1-50 μL, 0.1-25 μL, 0.1-10 μL, 1.0-100 μL, 1.0-75 μL, 1.0-50 μL, 1.0-25 μL, 1.0-10 μL, 2.5-100 μL, 2.5-75 μL, 2.5-50 μL, 2.5-25 μL, or 2.5-10 μL. In one aspect, the preferred size of the sample droplet is about 2.5-10 μL.

In one embodiment, the present disclosure provides a method of detecting a chemical and/or biological sample concentration by using the absorbance-based colorimetric device system of any embodiment of the present disclosure; wherein the method comprises:

providing a droplet of a chemical and/or biological sample onto to the sample plate of claim 1, wherein the sample droplet is loaded at a place that allows a light beam from the light source to pass the sample droplet and the sample plate, and to be received by the light-to-electrical signal-converting device; and obtaining concentration of the chemical and/or biological sample.

In one embodiment regarding the method of detecting a chemical and/or biological sample concentration, wherein the chemical and/or biological sample is a reacting product of a premixed mixture comprising a chemical and/or biological material to be tested and a reagent that can provide color change once the reagent is added to the chemical and/or biological material.

In one embodiment regarding the method of detecting a chemical and/or biological sample concentration, wherein a droplet of a chemical and/or biological material is loaded onto the sample plate, and followed by a droplet of a reagent that can provide color change once the reagent is added to the chemical and/or biological material. In one aspect, the order of the load sequence of the chemical and/or biological material and the reagent can be reversed.

Materials and Methods

FIG. 1 shows a schematic diagram of the experimental setup used for the absorbance measurements. The setup detects the light transmitted through a sessile droplet placed on a transparent, nonwetting substrate. An InGaAlP light-emitting diode (LED) with a peak wavelength of 590±10 nm (LED591E, Thorlabs) is aligned with a silicon photodiode (FD11A, Thorlabs) through a 0.84 mm-diameter aperture that confines the area of the illumination to within the radius of the droplet base footprint. The photodiode, which has a wavelength range of 320-1100 nm, is connected to a digital multimeter (34410A, Keysight) that records the signal at 10 Hz using a LabVIEW interface. The nonwetting substrate is fabricated using a glass slide of 1 mm thickness (3057, Gold Seal®). The slide is cut into a 2 mm×25 mm square substrate and cleaned in succession with acetone, methanol, and deionized (DI) water. Teflon granules (Teflon® AF2400, Dupont) are dissolved in a solvent (Fluorinert Electronic Liquid FC-72, 3M) to create a 1% weight/volume solution. This solution is then spin-coated onto the clean glass at 1500 RPM. The coated slides are then baked on a hot plate at 150° C. for 2 hr. The resulting low-surface-energy surface exhibits a contact angle of 125 deg for the sample-reagent mixture used in the experiments.

The droplet is composed of two solutions: the sample and the reagent. The sample is prepared by dissolving Bovine Serum Albumin (98% lyophilized powder, Sigma-Aldrich) into DI water to achieve the desired concentration of protein; the sample concentration is defined in the rest of this work by the amount of protein in DI water. The reagent is the Bradford reagent mixture (Sigma-Aldrich), which contains Coomassie™ Brilliant Blue G-250 dye in phosphoric acid and methanol. The reagent is initially of a reddish-brown color. The reaction between the protein (in the sample) and dye (in the reagent) results in the liquid changing to a blue color, with the degree of change corresponding to the concentration of protein in the sample. The change in absorbance of the liquid is most sensitive at a wavelength near 590 nm.

Experiments are conducted in two different configurations: (1) a pre-mixed case to confirm that the absorbance signals measured through the droplet medium have a detectable change over the target range of sample concentrations, and (2) an in situ mixing case to demonstrate the proposed concept of using the droplet as a self-contained passive mixing apparatus to make colorimetric measurements. All of the aforementioned experiments are performed at room temperature (21.5° C.). For the pre-mixed case, the sample and reagent are thoroughly mixed in a 1:5 ratio of sample to reagent in a test tube. After the sample is thoroughly mixed and the reaction is complete, a 10 μL droplet of this mixture is deposited on the substrate, quickly aligned between the LED and photodiode, and the signal recorded in volts. This approach effectively measures the signal of the completely reacted mixture, without introducing the complexities of real-time mixing and any reactions within the droplet. For the in situ mixing case, a 1.7 μL droplet of the sample is first placed on the nonwetting substrate. Reagent in the amount of 8.3 μL is then added to the sample droplet, thereby creating an approximately 1:5 sample-to-reagent ratio. The droplet is then aligned with the photodiode and the signal measured in real time for 1000 s. The experiments for both configurations are conducted at three sample concentrations: 0.1 mg/mL (1.51 μM), 0.15 mg/mL (2.26 μM), and 0.3 mg/mL (4.51 μM). Three trials are conducted at each sample concentration to ensure repeatability. One additional test case is performed at a concentration of 0.15 mg/mL (2.26 μM) with the substrate heated to 40° C. to demonstrate acceleration of the mixing process at elevated temperatures.

In order to calculate an absorbance metric from the raw signal, a 'blank' sample is used for reference, as is the case in conventional colorimetry. A droplet with a sample of 0 mg/mL concentration of protein is used as the blank, which allows a reference signal to be measured that takes into account the curvature of the droplet and the resulting lensing effects. Use of a blank sample for reference in this manner is possible because the pinned evaporation characteristics of the blank sample droplets are nearly identical to those of droplets with protein samples, as confirmed by the goniometric measurements shown in Figure S1 of the Supporting Information; the volume and height evolution of the droplets with and without protein in the sample during evaporation are identical. A key assumption in the absorbance metric is that the intensity of the light incident on the photodiode is linearly proportional to the voltage signal output read by the multimeter. Based on this assumption, a formulation analogous to Beer's Law is used to calculate the absorbance metric:

$$A = \log_{10}\left(\frac{V_0}{V}\right)$$

wherein A is the absorbance metric, $V_o$ is the voltage reading from the blank sample, and V is the voltage reading from the sample that is being measured. The signal measured from the blank sample is relatively constant throughout evaporation at a mean value of 0.1303 V. The overall lack of change in signal with evaporation indicates that any changes in lensing with changes in droplet volume are negligible with respect to the measured absorbance signal. As the sample concentration increases, it is expected that the absorbance signal at the LED will increase (i.e., the raw voltage signal will decrease) due to the liquid color change.

Results and Discussion

Figure 2:
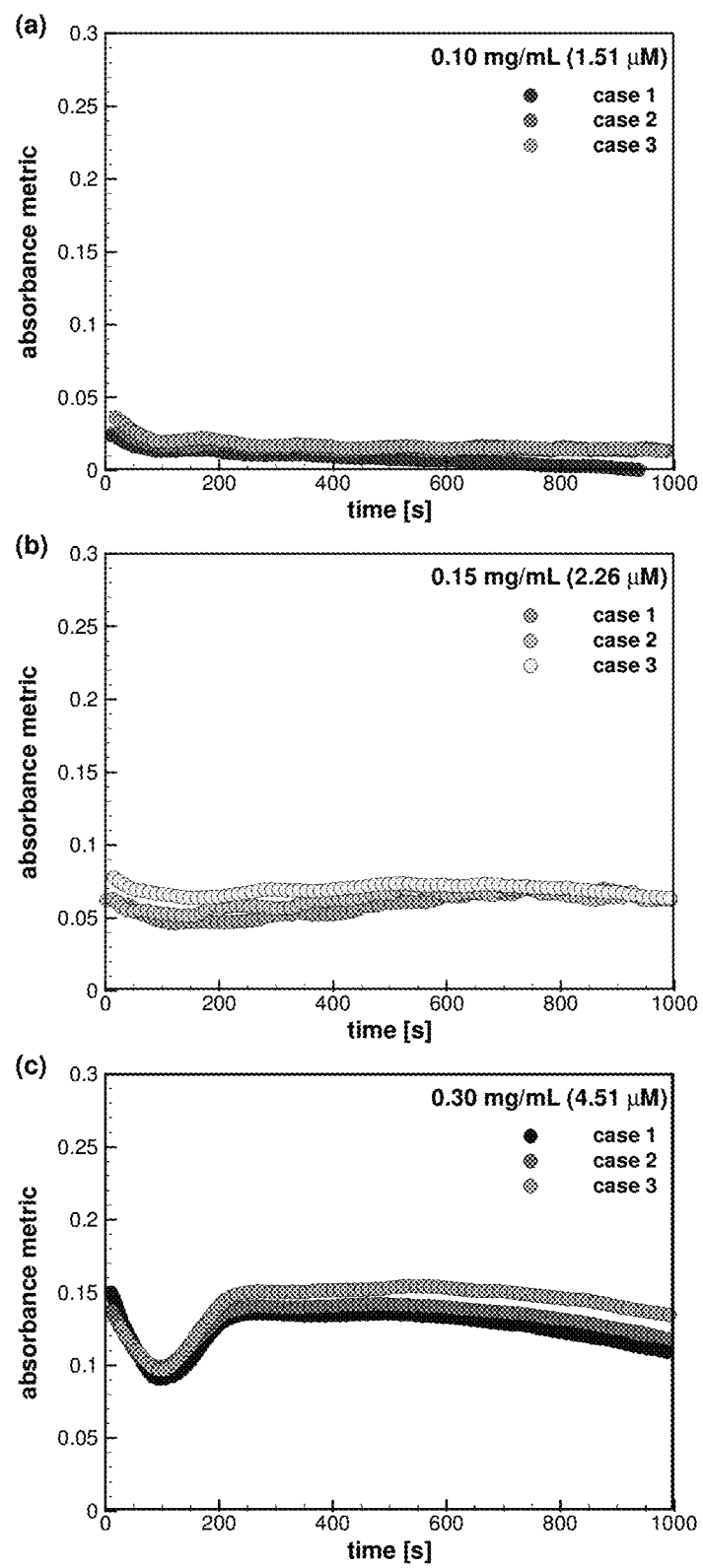
FIG. 2 illustrates absorbance metric measurements for premixed sample concentrations of 0.1 mg/mL (1.51 µM), 0.15 mg/mL (2.26 µM), and 0.3 mg/mL (4.51 µM).
Figure 3:
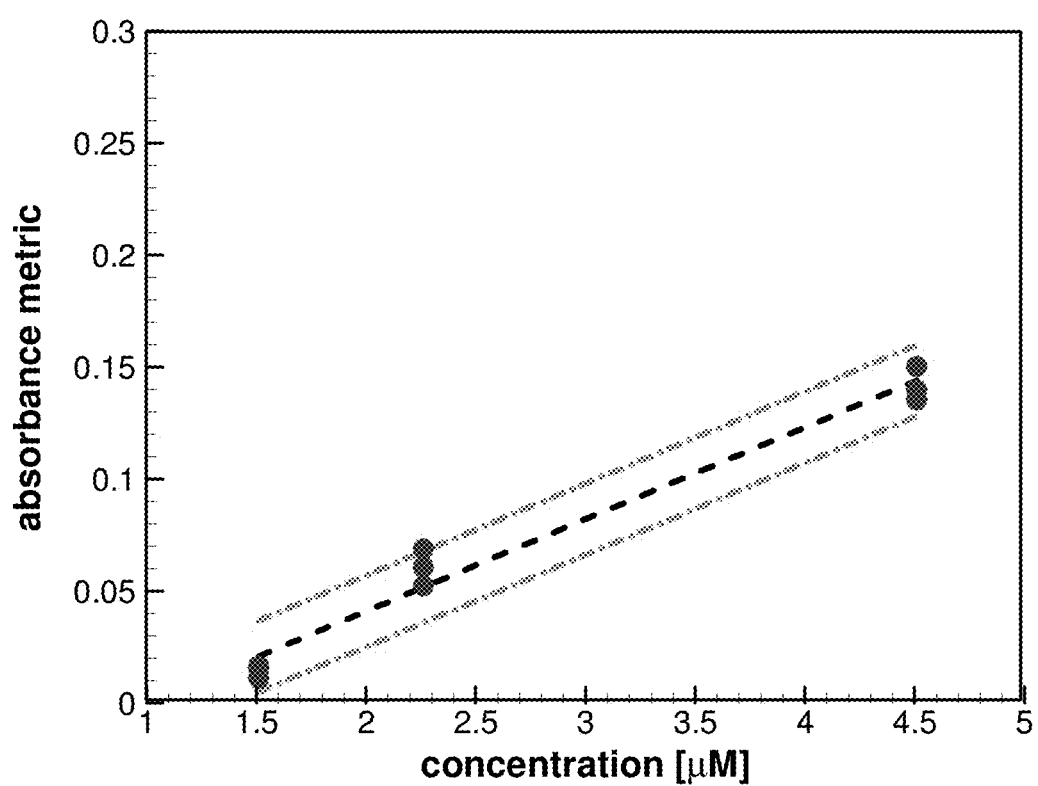
FIG. 3 illustrates absorbance metric values for samples at 400 s (extracted from FIG. 2) plotted as a function of concentration, along with a linear fit (dashed line) and an 80% prediction interval (dash-dotted line).

FIG. 2 shows the absorbance metric measurements for premixed sample concentrations of 0.1 mg/mL (1.51 μM), 0.15 mg/mL (2.26 μM), and 0.3 mg/mL (4.51 μM). The raw voltage measurements that were used to calculate these values are provided for reference in Figure S2 of the Supporting Information. As can be clearly seen in FIG. 2, the absorbance generally increases with concentration. There is an initial valley in the absorbance signal that becomes more pronounced at higher concentrations. This valley is likely due to buoyant convection in the droplet initially mixing the components and temporarily diluting the protein faster than it can react. There is also a gradual monotonic decrease in the absorbance with time towards the end of the measurement period as the protein absorbs onto the Teflon-coated substrate, reducing the droplet concentration. This trend is more apparent with increasing concentration due to the higher contrast in the signal between the blank and the test samples. FIG. 3 shows the absorbance metric value at 400 s as a function of the sample concentration, with a linear fit and an 80% prediction interval. A strong monotonic increase in absorbance is observed with increasing concentration. With this experimental confirmation of a measurable trend in the absorbance for a sessile droplet configuration, the proposed method of mixing in situ without resorting to an external mixing apparatus is explored next.

Figure 4:
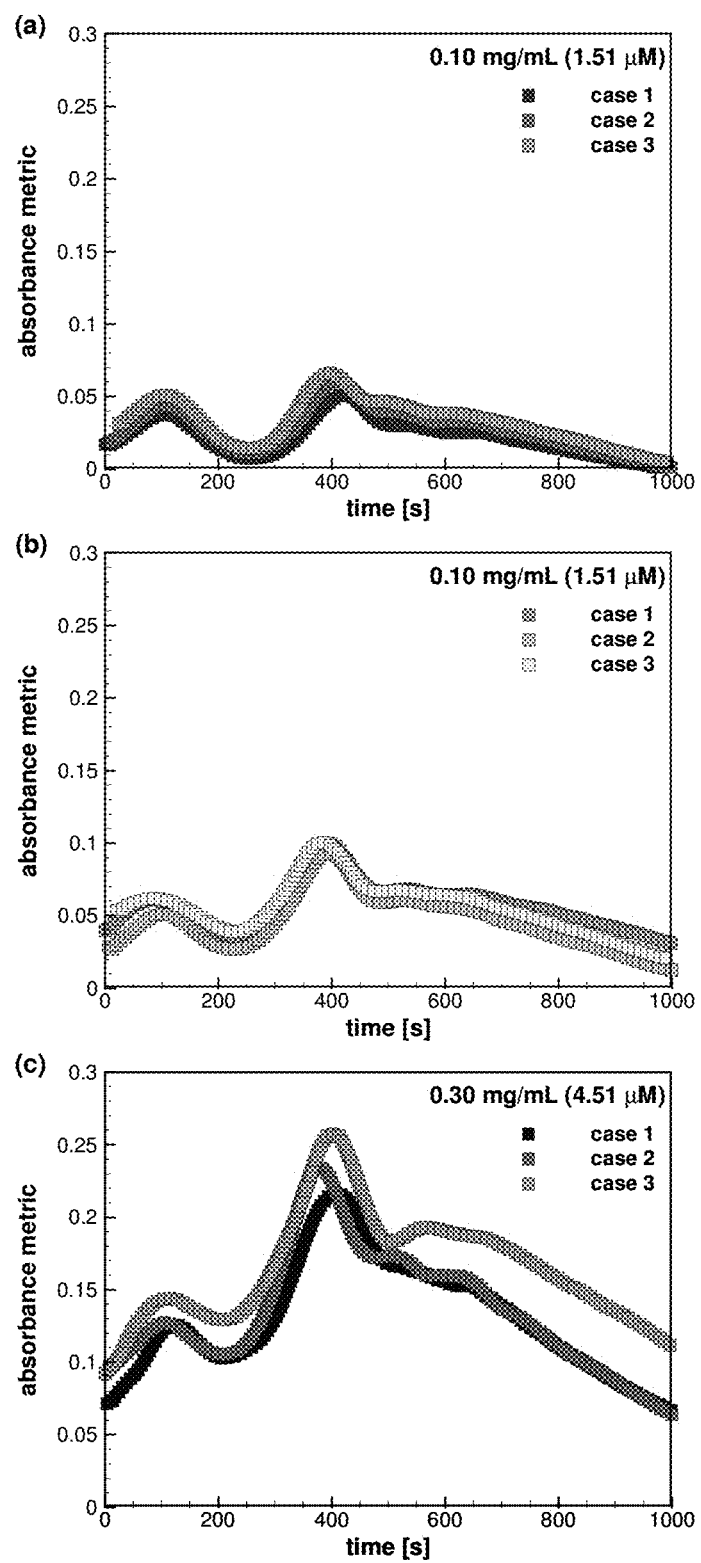
FIG. 4 illustrates time-resolved absorbance measurements for in situ mixed droplets at sample concentrations of: (a) 1.51 µM, (b) 2.26 µM, and (c) 4.51 µM.

The in situ mixing absorbance measurements, at sample concentrations of 0.1 mg/mL (1.51 μM), 0.15 mg/mL (2.26 μM), and 0.3 mg/mL (4.51 μM), are shown in FIG. 4(a), (b), and (c), respectively. A complex temporal absorbance signal is recorded for all samples, consistently featuring a slight increase followed by a slight decrease and then a large increase (approximately within the first ~400 s). Lastly, there is a gradual monotonic decrease in the absorbance metric that continues to the end of the experiment. This signal evolution results in two initial absorbance metric peaks (local maxima) with a valley (local minimum) in between. Overall, the absorbance increases with increasing protein concentration, as was observed in the pre-mixed cases; this concentration-dependence is especially prominent for the peak and valley values.

Figure 5:
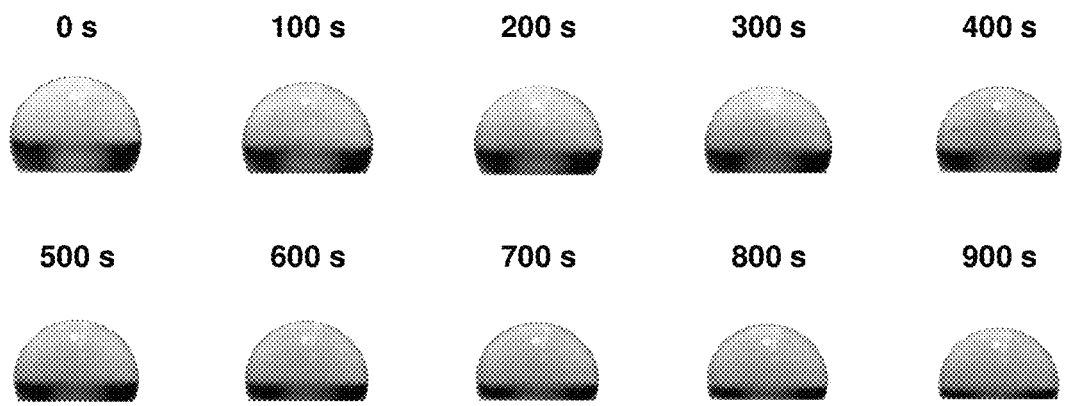
FIG. 5 illustrates image frames, captured at 100 s increments from the droplet video for the in situ mixing case at a concentration of 0.3 mg/mL (4.51 µM). The image background outside the droplet profile is cropped for clarity.

To understand the complexities of this evolution, videos were collected during the mixing and reaction process for the sample droplet of concentration 0.3 mg/mL (4.51 μM). At this concentration, color changes due to the reaction are clearly observable in the visible spectrum. A camera is placed horizontally facing the droplet to obtain a simultaneous record through the time period of the absorbance measurement. Images extracted from this video at 100 s increments are shown in FIG. 5. The images illustrate the interplay of buoyancy-induced mixing, chemical reaction, and protein adsorption, which play a significant role in determining the signal measured through the droplet as it progresses through multiple color levels of darker blue (higher absorbance at the 590 nm wavelength) and lighter blue or brown (lower absorbance at the 590 nm wavelength). Alongside the discussion to follow, the reader is encouraged to view the videos included as Supporting Information, which best illustrate this progression.

Figure 6:
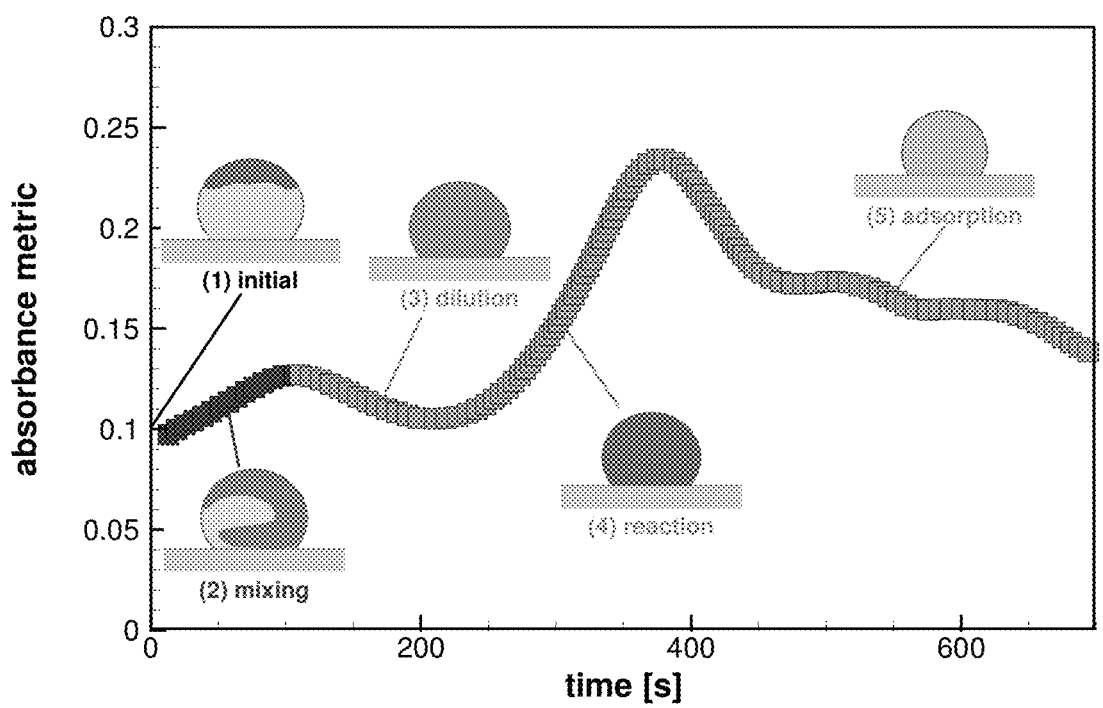
FIG. 6 illustrates a plot of the temporal absorbance metric for a selected trial at a sample concentration of 0.3 mg/mL (4.51 µM) with inset schematic drawings showing the various phases of in situ mixing of the reactant and sample, including: (1) the initial droplet, (2) the mixing phase, (3) the dilution phase, (4) the reaction phase, and (5) the adsorption phase.

The color distribution observed in the video is analyzed to determine the dominant mechanisms that lead to the different phases of the droplet temporal absorbance signal. These phases are determined by observing the peaks and valleys, and the trends in-between, the absorbance metric plot shown in FIG. 4(c). The phases and associated mechanisms are illustrated in the representative inset diagrams of FIG. 6: (1) Initially, the protein sample amasses at the top of the droplet and the initial reaction creates a dark blue region directly in the path between the light source and the photodiode. Buoyant convection then distributes this mass through the droplet in the subsequent (2) mixing phase, causing more of the protein to react and resulting in the absorbance increasing slightly during this phase. However, the mixing eventually dilutes the color faster than the reaction occurs in the (3) dilution phase, resulting in the droplet absorbance decreasing slightly. Once the sample is thoroughly mixed, the droplet enters a (4) reaction phase where the reaction dominates dilution, thus darkening the droplet and increasing the absorbance dramatically. Once most of the protein has reacted into protein-dye complexes, the droplet enters the (5) adsorption phase, where the protein adsorbs onto the Teflon-coated substrate faster than any continuing reaction. This causes the droplet to revert to the native reddish-brown color of the reagent and the absorbance metric drops monotonically till the end of the experiment. The time difference between the two peaks in the absorbance signal was analyzed and found to be virtually identical across all concentrations (293.3±12.9 s) indicating that the mixing and reaction time scales do not change discernibly with concentration. This is expected as the substrate temperature is held constant in all the trials, resulting in the same extent of buoyancy-induced convection.

Figure 7:
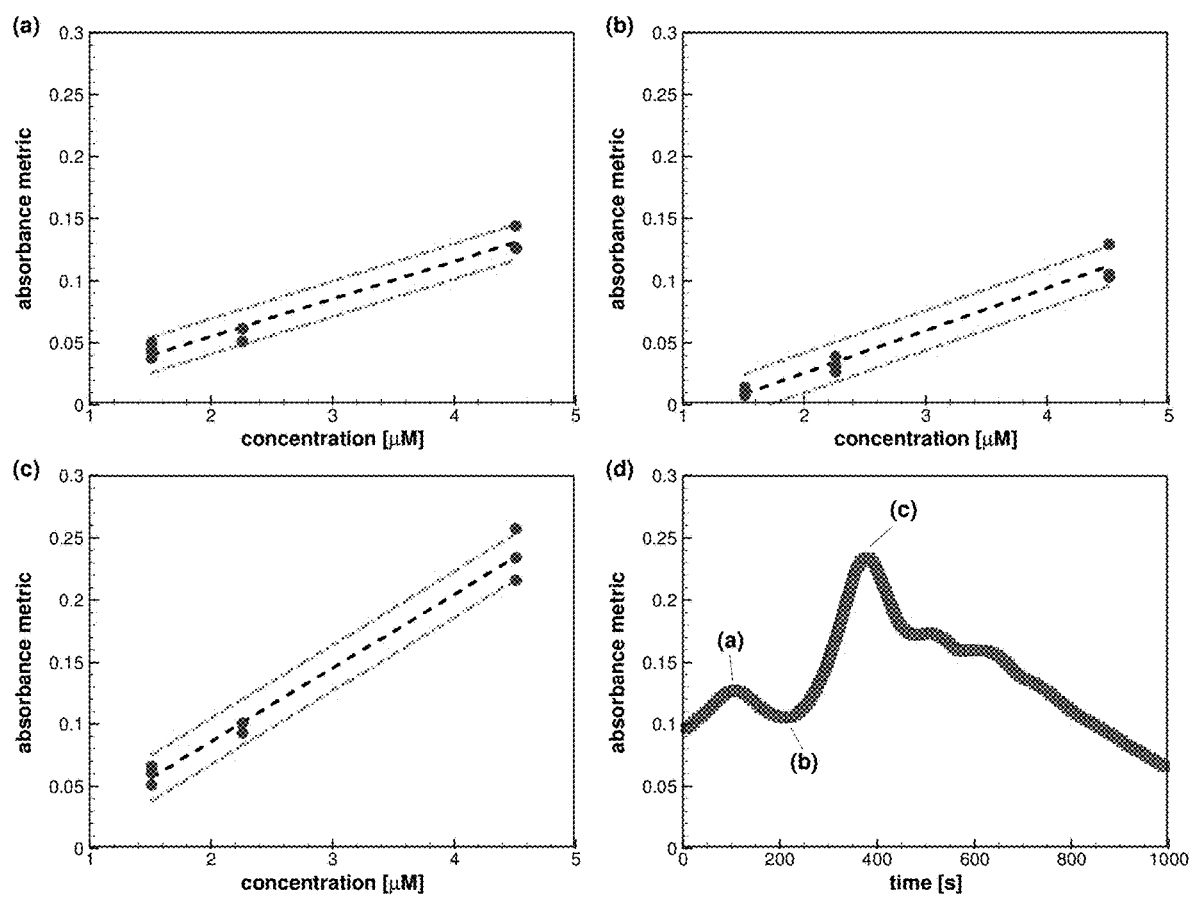
FIG. 7 illustrates the absorbance metric as a function of the sample concentration at (a) the first peak, (b) the first valley, and (c) the second peak, along with their respective linear fits (dashed lines) and 80% prediction intervals (dash-dotted lines). The corresponding locations of the peaks and valleys in the temporal data are illustrated for one example trial in (d).

FIG. 7 shows an analysis of the measured absorbance metric at the peaks and valley. The values for the first peak, the valley, and the second peak are plotted as a function of concentration in FIG. 7(a-c) along with a linear fit and an 80% prediction interval to determine whether these values may be used to determine concentration. FIG. 7(d) shows corresponding positions of these data points for a selected trial at a sample concentration of 0.3 mg/mL (4.51 µM). For all three positions, the linear fit and prediction intervals show strong monotonic relationships between the absorbance metric value and the concentration. In particular, the second peak shows the strongest linear relationship, with a slope of 0.892 $\mu M^{-1}$, compared to slopes of the first peak and valley, respectively 0.453 $\mu M^{-1}$ and 0.515 $\mu M^{-1}$. For comparison, the pre-mixed cases exhibited a slope of 0.616 $\mu M^{-1}$ (FIG. 3). Therefore, the second peak is demonstrates the best sensitivity for a colorimetric assay.

Figure 8:
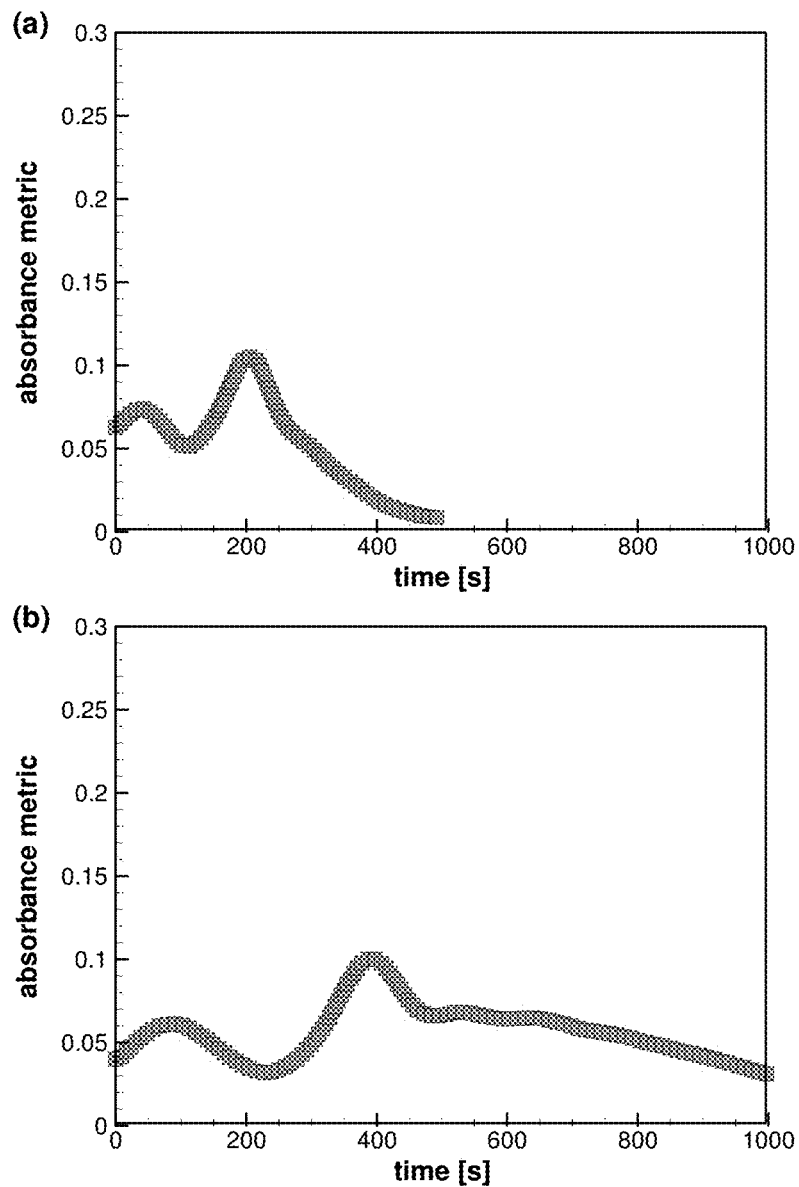
FIG. 8 illustrates time-resolved absorbance measurements for in situ mixed droplets at a sample concentration of 0.15 mg/mL (2.26 µM) for a substrate temperature of (a) 40° C. and (b) room temperature (21.5° C.).

FIG. 8 shows the results for the case with the substrate heated to a temperature of 40° C., compared to those at room temperature. A comparison of the timescales of the peaks and valleys demonstrate a dramatically increased rate of mixing and, consequently, earlier completion of the reaction at a higher temperature. In some previous study of buoyancy-induced convection in droplets on nonwetting surfaces, Dash et al. demonstrated that mixing times on hydrophobic surfaces similar to those used in the current study are ~15 times longer than on superhydrophobic surfaces. At a substrate temperature of 40° C., the hydrophobic surface used here may be expected to exhibit a mixing time of ~150 s, based on the mixing time of ~10 s for superhydrophobic substrates. See Dash, S.; Chandramohan, A.; Weibel, J. A.; Garimella, S. V. Buoyancy-Induced on-the-Spot Mixing in Droplets Evaporating on Nonwetting Surfaces. *Phys. Rev. E* 2014, 90 (6), 062407. https://doi.org/10.1103/PhysRevE.90.062407. For the heated substrate case in FIG. 8, the mixing is complete at ~125 s. Clearly, heating of the substrate is a viable method for dramatically speeding the time to measurement, as long as the denaturation temperature of the protein is not reached. Given this reaction speed-up, along with the miniaturization of the measurement platform, droplet-based micromixing is demonstrated to be a viable alternative to micro-titer plates for colorimetric measurements, which require longer or more complex mixing processes and complex fabrication.

As disclosed herein, absorbance-based colorimetry is conducted using a sessile droplet on a nonwetting substrate. A discernible trend in the measured absorbance with sample concentration is first demonstrated in a sessile droplet for a case when the sample and reagent are pre-mixed. The sample and reagent are then mixed in situ within a droplet, and the absorbance is measured in real time throughout the process. The measured temporal absorbance signal results from combined interactions between buoyancy-induced mixing, reaction between the sample and reagent, and adsorption of the protein molecules onto the nonwetting substrate. Analysis of videos of the reacting medium reveal the phases where each of these mechanisms dominates the trend in droplet absorbance. The second transient peak in the absorbance measurement, associated with completion of the reaction, provides the highest sensitivity to sample concentration, and is therefore recommended for colorimetric quantitation during in situ mixing. Heating the substrate is shown to dramatically increase the rate of mixing, allowing for rapid concentration measurements. Overall, this sessile-droplet-based approach for absorbance-based colorimetry provides a promising alternative to microwells for high-throughput parallel assays, due to the simple implementation and enhanced passive micromixing.

Those skilled in the art will recognize that numerous modifications can be made to the specific implementations described above. The implementations should not be limited to the particular limitations described. Other implementations may be possible.

We claim:

1. An absorbance-based colorimetric device system, comprising:
    a light source;
    a single sample plate, wherein the sample plate comprises a first side, wherein the first side of the sample plate is coated and configured to load a sessile sample droplet to be tested, wherein the sessile sample droplet is mixed in-situ, and a second side on the opposite side to the first coated side, wherein the first coated side is configured to allow the sessile sample droplet loaded onto the first coated side to be substantially non-wetting, and wherein the sample plate has sufficient transparency and therefore passes some or all light received from the light source after the light is passed through the sample sessile droplet;
    a light-to-electrical signal-converting device, wherein the light-to-electrical signal-converting device is placed adjacent to the second side of the sample plate; and
    an optional aperture, wherein when the optional aperture is placed between the light source and the first coated side of the sample plate and configured to direct the light to the sessile sample droplet by confining the area of light to be passed through the sessile sample droplet loaded onto the sample plate,
    wherein the single sample plate is configured to be placed between the light source and the light-to-electrical signal-converting device.

2. The absorbance-based colorimetric device system of claim 1, wherein the light-to-electrical signal-converting device is a photodiode.

3. The absorbance-based colorimetric device system of claim 1, wherein the sample plate is a partial or complete transparent polymer or glass plate.

* * * * *